OMNIDIRECTIONAL RADIO BEACON SYSTEMS

Filed Oct. 9, 1959 4 Sheets-Sheet 1

INVENTORS: JOHN A. PEACH
MELVIN S. STILES
BY
R. L. Styner
ATTORNEY

Dec. 24, 1963 J. A. PEACH ETAL 3,115,632

OMNIDIRECTIONAL RADIO BEACON SYSTEMS

Filed Oct. 9, 1959 4 Sheets-Sheet 2

INVENTORS: JOHN A. PEACH
MELVIN S. STILES

BY T. L. Styner

ATTORNEY

Dec. 24, 1963 J. A. PEACH ETAL 3,115,632

OMNIDIRECTIONAL RADIO BEACON SYSTEMS

Filed Oct. 9, 1959 4 Sheets-Sheet 3

INVENTORS: JOHN A. PEACH
MELVIN S. STILES

BY

[signature]

ATTORNEY

INVENTORS: JOHN A. PEACH
MELVIN S. STILES
BY
T. L. Styner
ATTORNEY 3,115,632

OMNIDIRECTIONAL RADIO BEACON SYSTEMS

John A. Peach and Melvin S. Stiles, Rochester, N.Y., assignors to General Dynamics Corporation, Rochester, N.Y., a corporation of Delaware Filed Oct. 9, 1959, Ser. No. 845,348
9 Claims. (Cl. 343—106)

This invention relates to radio beacon systems and particularly to omnidirectional systems whereby an airborne receiver may translate signals broadcast from such a beacon into directional indications.

The object of the invention is to provide improvements in conventional systems of this nature by the use of less costly and more rugged electronic components.

In accordance with this invention an omnidirectional radio beacon is operated to broadcast a signal in a directive radio pattern which is then rotated at a given rate so that the signal remotely received will appear as an amplitude variation having a fundamental frequency component determined by the rate of rotation. Another signal is transmitted uniformly at a fixed point of the rotation of said signal to produce a reference signal whereby a comparison of the phase of the amplitude variation and the phase of this fixed point reference signal will define the bearing of the receiver. This much is conventional and may be found fully described in Patent 2,753,554, issued July 3, 1956, to Adams et al., and in the text, "Electronic Avigation Engineering," by Peter C. Sandretto, published 1958 by International Telephone and Telegraph Corporation, 67 Broad Street, New York 4, New York, page 521 et seq. In accordance with these prior art devices, the bearing of a craft with respect to the beacon can readily be obtained by making a phase comparison of the two waves, one exhibiting an amplitude variation defining a fixed compass point and the other exhibiting an amplitude variation defining an azimuth measurement related to the said fixed bearing.

Heretofore the means employed for making the said phase comparison has been embodied in finely adjusted costly apparatus which is difficult to obtain and to operate within the required accuracy.

The object of the present invention is to substitute a time base in effect rather than phase shifting techniques and allow the use of linear potentiometers in place of the sine-cosine potentiometers or phase shifting resolvers for either a left-right indicator or bearing measurement application and in addition providing for the use of relatively simple methods of obtaining direct bearing indications.

In accordance with the present invention the said conventional beacon transmits a nine lobed pattern at the rate of 15 c.p.s. whereby a 15 c.p.s. wave is manifested in the receiving device together with a ninth harmonic (135 c.p.s.) thereof. The received 15 c.p.s. may be used for rough approximations and the 135 c.p.s. harmonic may be used for greater accuracy.

Fundamentally, the object of the present invention is to derive a square topped wave from each cycle of the said received 15 c.p.s. wave whereby for a given portion of the cycle a given potential will be provided and whereby for the remainder of the cycle this potential will be reduced so that there will be a sharp contrast between these two portions. The ratio betwen the active portion and the whole length of the cycle will be a definite proportion of the 360° which the cycle represents and this definite portion measured between the line to the beacon and a fixed bearing line, say a north south line, will be the bearing of the receiver with respect to the beacon.

Means is therefore provided to derive a 15 c.p.s. series of spikes from the 15 c.p.s. bearing envelope and these in conjunction with the fixed bearing spikes (the reference signals) may be used to operate a flip-flop whose output will appear to be a rectangular wave defining by its length or by the ratio of its length to the cyclic 15 c.p.s. period the bearing of the receiver.

The bearing envelope will appear substantially as a sine wave and trigger spikes may be derived from this at each zero crossing by conventional methods. The sine wave is amplified, the peaks thereof are limited and the sharp rise thereof at the zero crossing are differentiated into trigger spikes. 180° ambiguity is avoided by selection of each alternate spike. There is then provided a trigger spike at what may be termed the beginning and end of each 15 cycle period.

Somewhere in between these trigger spikes the said fixed reference signal will occur at a point which will be a measure of the bearing of the receiver. Therefore, if a flip-flop or scale of two circuit is triggered on by the trigger spikes and triggered off by the fixed reference signals, the output of the flip-flop will provide a train of rectangular pulses occurring at a 15 c.p.s. rate. By measuring the average voltage of these rectangular pulses a voltage is obtained which varies linearly wth the duty cycle and thus linearly with the bearing. A vacuum tube voltmeter will accurately measure the average voltage output of the scale of two circuit and thus a properly calibrated meter may be employed to give a direct reading of the bearing.

For greater accuracy, means may be provided to produce other rectangular waves for comparison with the said rectangular waves derived from the said bearing envelope spikes and the fixed signal spikes. This means is embodied in a conventional electronic device known as a phantastron, fully disclosed in the above noted text, "Electronic Avigation Engineering." This is an extremely accurate delay device which may be triggered on by the said bearing envelope spikes and which will produce an output and therefore a rectangular wave of a duration in direct proportion to an input potential. If such an input potential representing a range of 360° is derived from a linear potentiometer, then a dial moving over a scale of 360° may indicate the value of the output of the said phantastron and if this output is fed into a comparison circuit for comparison with the value of the rectangular waves produced by the said flip-flop, the indication on the scale of the said linear potentiometer when equality in the comparison circuit is reached will provide a direct reading of the bearing of the receiver.

In practice, the said linear potentiometer may be manually adjusted until a given comparison indication is achieved. However, it is within the scope of the present invention to drive the said linear potentiometer by a conventional servo mechanism controlled by the said comparison circuit whereby the bearing indication will be automatically derived and maintained.

In accordance with another form of the present invention, a phantastron is employed to produce a rectangular wave starting with the fixed bearing signal and extending to the reference pulse. The length of this phantastron square wave is controlled by a linear potentiometer which is driven backward or forward by a motor and which in turn is controlled by a pair of coincidence circuits enabled by the output of the phantastron and by a gate derived from the reference bearing signal. If the output of the phantastron is exactly equal to the distance (in degrees) from the fixed signal to the bearing, then the gate signal will appear just as the output of the phantastron ends and neither of the coincidence circuits will produce an output and hence the motor for adjusting the linear potentiometer, and the azimuth indicator, will not be operated. However, where there is any overlap between the output of the phantastron and the bearing signal, one or the other of the said coincidence circuits will become active and the motor will operate to bring the phantastron output into equality with the actual bearing so that the azimuth indicator will very accurately display the bearing of the receiver with respect to the beacon.

Since the phantastron rectangular output is thus very accurately fitted into the portion of the revolution of the bearing signal between the time when the effective direction of the bearing signal coincides with the fixed direction, say a north south line, and the time when the bearing signal exhibits its greatest field strength, this rectangular output is a true measure of the bearing of the airborne receiver with respect to the beacon. Therefore an azimuth indicator moved by the said motor along with the linear potentiometer which controls the phantastron period will give an accurate indication of the bearing.

A feature of the invention is a means for deriving from a receiver a rectangular wave measuring the bearing angle of a receiver with respect to an omnidirectional beacon coupled with means to translate the ratio of this rectangular wave to the complete cycle of which it is a part. One of the most accurate ways of measuring this ratio is by the use of an electronic device known as a phantastron which responds to an input potential with remarkable accuracy. Whereas the objects of this invention may be fulfilled by the use of a flip-flop triggered on and off by spikes or trigger pulses derived from the bearing wave and the fixed direction signal, and then measuring the average output thereof, greater accuracy may be obtained by translating the setting of the means for controlling the input potential of the phantastron into bearing angles.

Other features will appear hereinafter.

The drawings consist of four sheets having eleven figures, as follows.

Figure 10:
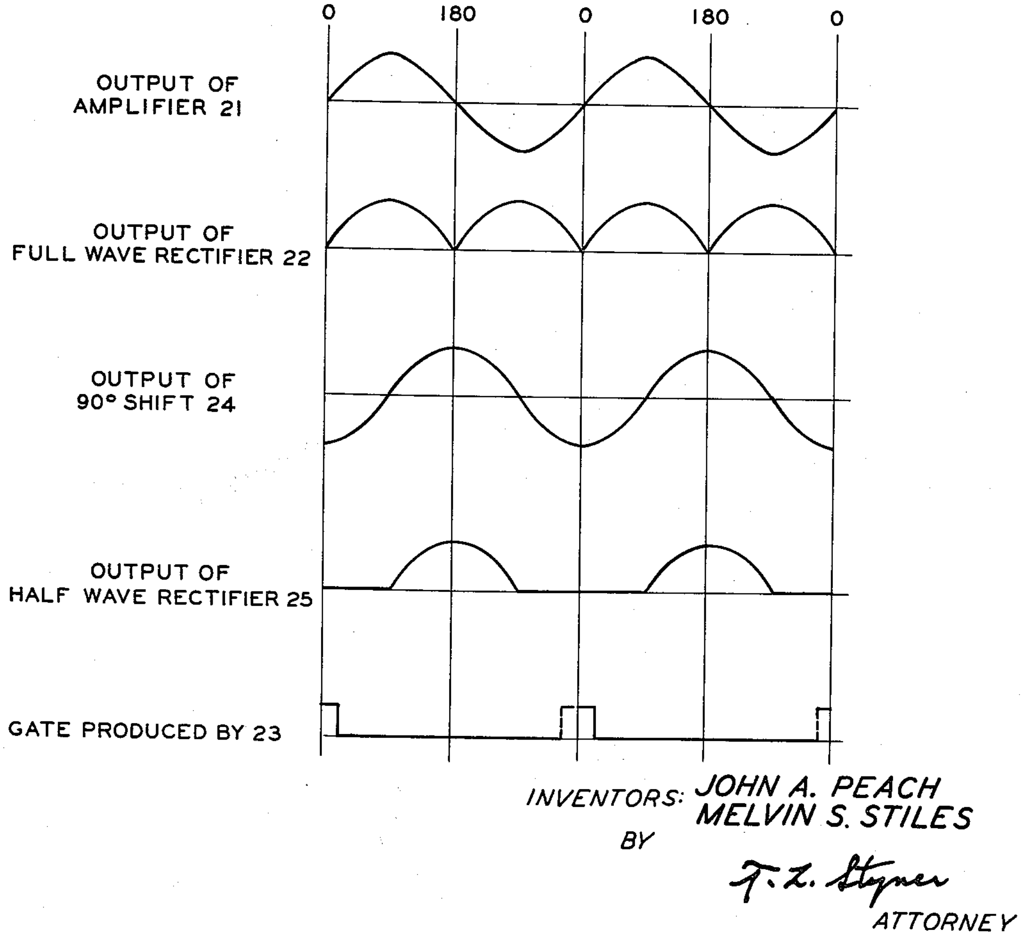
Figure 11:
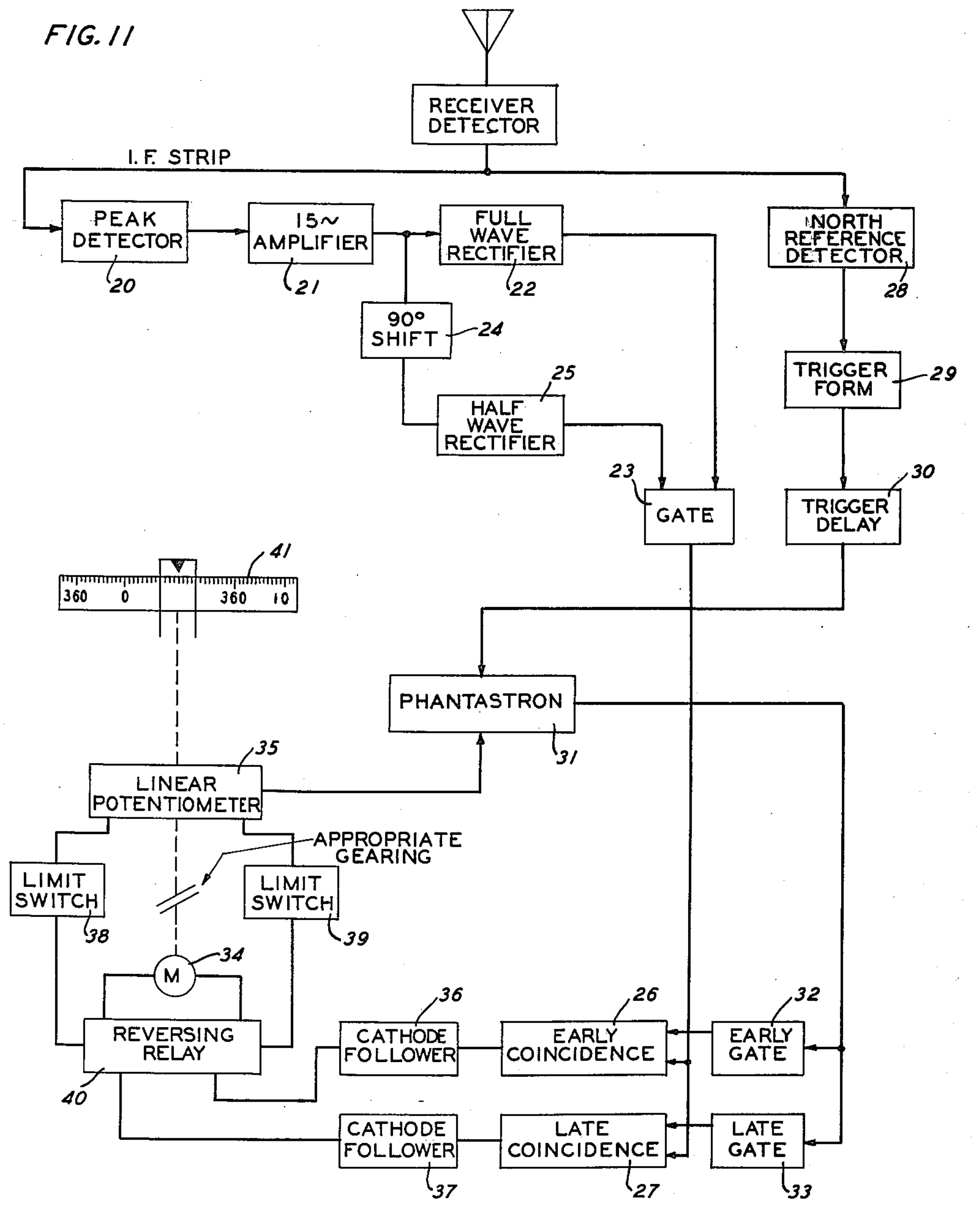

FIG. 10 is a nest of graphs used to explain the operation of another form of the invention shown in the following FIG. 11; and FIG. 11 is a schematic block diagram showing the cooperative relationship of a plurality of conventional electronic elements including particularly a phantastron which may be employed to operate exactly between a fixed bearing or reference pulse and a trigger pulse signaling the bearing of the receiver with respect to the beacon and which controls, by an electrical motor, both an azimuth indicator and the phantastron control whereby the adjustment of the length of the signal produced thereby is automatically controlled.

In accordance with a complete description embodied in the text "Electronic Avigation Engineering" of the beacon employed, it will appear that means is provided for radiating a composite signal which may be translated in an airborne receiver into a sine wave phased in accordance with the bearing of the receiver with respect to the beacon and a fixed direction reference signal whereby the angular relation between the two may be detected, measured and displayed. Heretofore, and in accordance with the prior art, this result was achieved by phase comparison methods, but such methods require expensive and delicately balanced apparatus. Applicant achieves equally reliable results by more economical methods and less costly means.

The beacon comprises a vertical central element which is fixed in position but has two encompassing cylinders, the inner having one and the outer having nine parasitically excited elements, and these two cylinders are rotated together at a speed of 15 revolutions per second.

Figure 1:
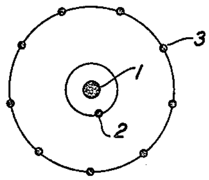
FIG. 1 is a schematic plan view of the beacon antenna.
Figure 2:
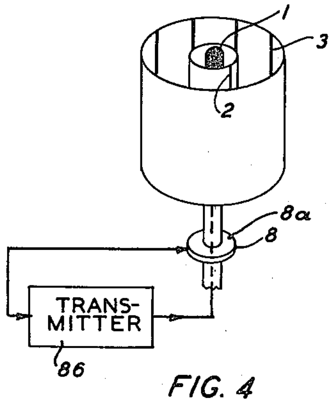
FIG. 2 is a schematic perspective view of the same.

FIG. 1 is a sectional plan view of the essential elements of the beacon, the centrally located element 1 representing the antenna, the single element 2 of the inner cylinder representing the single parasitic element carried thereby and the element 3 of the outer cylinder representing one of the nine parasitic elements carried thereby.

Figure 3:
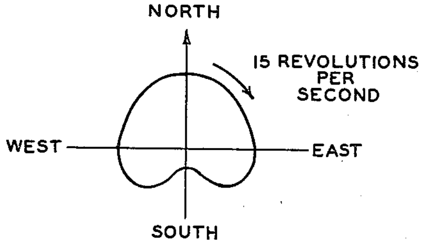
FIG. 3 is the circular radiation pattern of the central element of the antenna, actually the envelope of the strength of the radiation pulses transmitted therefrom.
Figure 4:
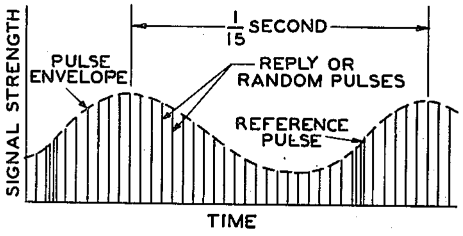
FIG. 4 shows the polar-coordinate pattern replotted in rectangular coordinates to illustrate the effective sine wave which may be manifested in the receiver.

Each parasitic element reflects energy in one direction and attenuates the energy in the exactly opposite direction. FIG. 3 shows the envelope of the signal strength represented by the cardioid pattern which would be drawn through the extremities of the polar coordinates representing the signal strength of the pulses transmitted as caused by any single one of the said parasitically energized elements, such as the one element 2 embedded in the inner cylinder. It will be understood that since the cylinder is rotated, this pattern will rotate in like manner. FIG. 4 is the same as FIG. 3, but translated into rectangular coordinates whereby the cardioid becomes a sinusoid. The various vertical lines in FIG. 4 represent the approximately 2700 pairs of pulses per second supplied to the antenna at all times and which being of absolutely equal amplitude are through the said parasitically energized elements transmitted at such various strengths. Since the antenna revolves at 15 revolutions, this sine wave envelope is propagated at a frequency of 15 cycles per second.

Figure 5:
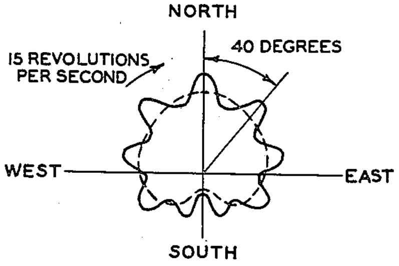
FIG. 5 illustrates the composite radiation pattern produced by the two revolving cylinders, the inner one having a single antenna element to produce the 15 c.p.s. component and the outer one having nine elements to produce the 135 c.p.s. or ninth harmonic thereof.
Figure 6:
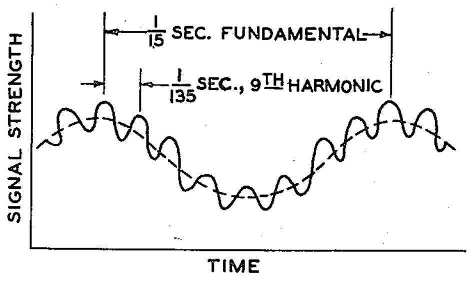
FIG. 6 illustrates the wave received as a result of the rotation of the antenna, the above noted FIGURES 1 to 6 inclusive representing the prior art and being taken from the said text "Electronic Avigation Engineering"

The combination of the one element embedded in the inner cylinder and the nine elements embedded in the outer cylinder produce the result shown in FIGS. 5 and 6, thus producing a fundamental of 15 c.p.s. and the ninth harmonic thereof of 135 c.p.s.

The reference pulse is produced by an iron slug 8a in the rim of the wheel 8 which is keyed to the antenna shaft. The slug which passes under a pick-up head, modulates the transmitter 86 and a burst of coded microsecond pulses as the cardioid passes through the north or reference signal line.

Figure 7:
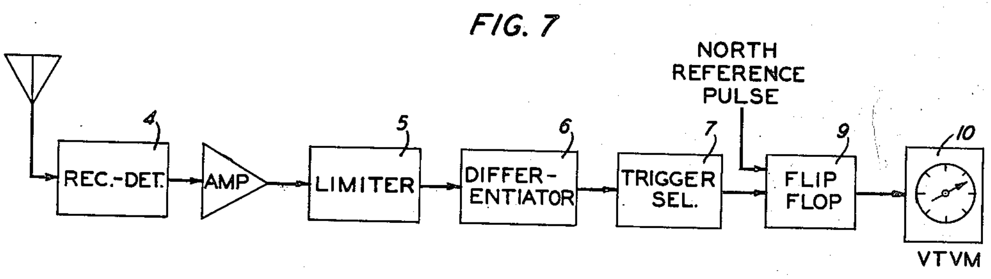
FIG. 7 is a schematic block diagram showing the series of conventional electronic circuits elements employed to produce an indication of the bearing of the receiver with respect to the beacon.
Figure 8:
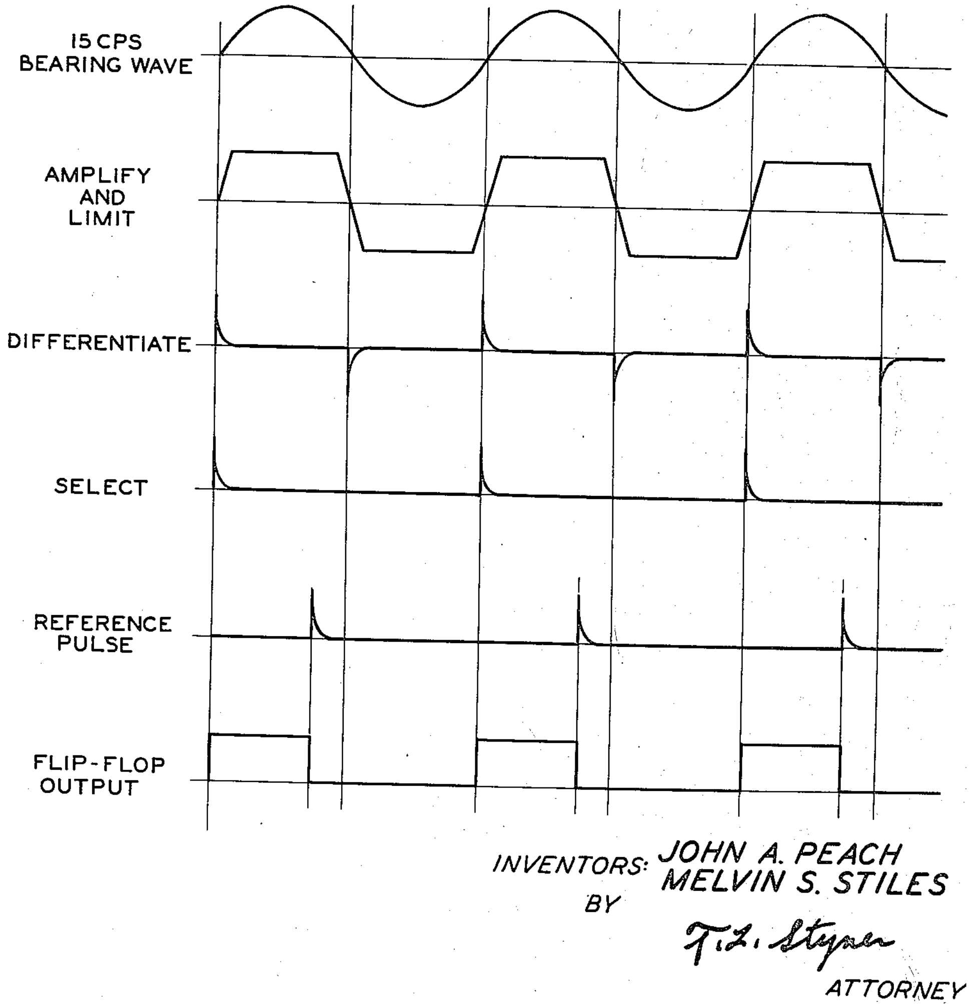
FIG. 8 is a nest of graphs indicating the translation of the bearing sine wave into a set of trigger pulses which with the fixed bearing reference pulses are employed to operate a flip-flop on and off to produce a rectangular output whose average value is a measure of the bearing and which may be indicated by a properly calibrated vacuum tube voltmeter.

In accordance with the basic embodiment of the present invention the airborne receiver 4 (FIG. 7) translates the wave it detects into a clear 15 c.p.s. sine wave, amplifies this sine wave to get a substantially vertical configuration of the sine wave at the zero crossings, to very accurately signal these points (see FIG. 8) then limits or clips the tops of the wave by a conventional limiter 5 and differentiates the zero crossings to produce a trigger pulse at each such crossover. The differentiating circuit 6 is a conventional high pass filter circuit and will produce the trigger pulses as indicated in the third graph of FIG. 8. Means 7 for selecting for use only the positive going trigger pulses may be conventional rectifier. The fixed bearing or north reference pulses may be derived from the receiver in conventional manner by decoding the burst of coded microsecond pulses and a conventional flip-flop may be triggered on by the selected trigger pulses and triggered off by the fixed bearing (north reference) pulse so that the duration of the square loop, or duty cycle, of the output thereof becomes a measure of the bearing. A vacuum tube voltmeter movement will exhibit the average value of this rectangular wave.

Figure 9:
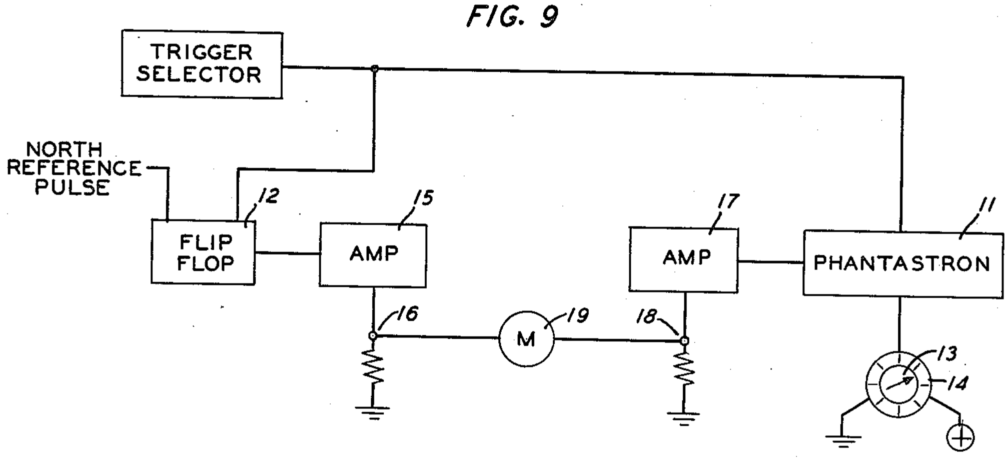
FIG. 9 is a schematic block diagram showing the same kind of circuit as that in FIG. 7 and in addition a phantastron which is triggered on by the same trigger pulse as the flip-flop in FIG. 7 and which may be adjusted to be exactly equal in its operative duration, the adjusting means being coupled to a bearing indicator to display the bearing of the receiver with respect to the beacon.

Inasmuch as a vacuum tube voltmeter may not accurately indicate average values of the rectangular wave for low duty cycles, as when the pulse output of the flip-flop 12 becomes very narrow, it is provided according to another and important feature of this invention to employ a circuit which accurately measures the duty cycle throughout its entire range. According to this feature a phantastron is employed for generating a square wave which is the exact duplicate, in amplitude and duration, of the output of the flip-flop 9 in FIG. 7 or of the flip-flop 12 in FIG. 9. The phantastron used here will generate the rectangular wave of the last graph of FIG. 8 and will vary the duration of each pulse so that the duty cycle of the phantastron output can exactly match the duty cycle of the flip-flop output. Conveniently, the duty cycle of the phantastron employed here may be varied from zero upwardly by a variable direct current voltage. One phantastron adapted to this invention is indicated in FIGS. 9 and 11 of the drawing and is similar in operation to the phantastron circuit shown on page 465 of the text "Electronic Avigation Engineering," by Sandretto, supra. In this circuit the leading edge of a square wave at the output instantaneously follows the receipt of the input pulse, and the duration and the trailing edge of the square wave is determined by the direct current voltage applied to the cathode of diode 1 (see page 465). As stated above, the duration of the output pulse can be varied from zero upwardly and hence the phantastron can always generate a wave that will match and can balance against the output of flip-flop 12 throughout the 0° to 360° range of azimuth readings.

A phantastron is a conventional electronic delay device which may be triggered on at any time, which will at a given time thereafter produce an output signal and in which the said given time may be very precisely controlled. The phantastron may therefore be used to produce a rectangular output wave like that produced by the flip-flop 9. In the present arrangement the flip-flop 9 is triggered on by a bearing wave trigger pulse and then triggered off by a fixed bearing trigger pulse. As shown in FIG. 9, a phantastron 11 is triggered on by the same bearing wave trigger pulse as the flip-flop 12 but is triggered off by the means 13, which may be a linear potentiometer, for adjusting the potential input thereto so if this means is adjusted (manually or automatically) until the output of the phantastron 11 is exactly equal to the output of the flip-flop 12, a reading of a calibrated adjustment dial 14 will exhibit the value of the rectangular wave produced by the bearing wave and the fixed bearing signal and therefore give a direct reading of the bearing of the airborne receiver with respect to the beacon.

The output of the flip-flop 12 leads to an amplifier 15 providing a cathode follower connection 16 and likewise the output of the phantastron 13 leads to an amplifier 17 providing a cathode follower connection 18. A meter 19 provides a means to compare the condition at point 16 with the condition at point 18. Therefore, if the linear potentiometer used for adjusting the output of the phantastron 11 is adjusted until the reading of the meter 19 indicates that the output of the phantastron 11 is exactly equal to the output of the flip-flop 12 the angular bearing of the airborne receiver may be read on the dial indicator 14.

The meter indicator 19 may be a zero center device so that the desired course bearing can be set on the dial indicator and the pilot may fly a "follow-the-needle" course by keeping the meter pointer centered (null indicator on the meter).

It may be noted that the linear potentiometer may be controlled in its setting by a knob 13 carrying an indicating mark operating in cooperative relationship with a (360°) bearing indicator 14 whereby the phantastron is subject to manual control. Applicants also employ servo mechanism automatic control whereby the comparison meter 19 may be eliminated and servo mechanism control contacts substituted therefor. FIG. 11 shows one manner in which the automatic adjustment of the phantastron may be carried out.

In accordance with the embodiment of the invention shown in FIG. 11 and explained with the help of FIG. 10, a peak-riding detector 20 of conventional design will remove the 15 cycle sine wave modulation from the detected intermediate frequency strip output and its output will be conveniently amplified by the amplifier 21. The output of this amplifier leads both through a full wave rectifier 22 to a gate forming circuit 23 and through a 90° shift network 24 and a half wave rectifier 25 also to the gate 23.

The gate forming circuit 23 is arranged to produce a narrow gate from each negative going null of the 15 cycle rectified wave. It is necessary here to have a large amplitude 15 cycle rectified wave if a well defined narrow gate is to be obtained. Hence the output of the amplifier 21 is shifted 90° in phase by an R-C network 24 and rectified by the half wave rectifier 25. The resultant wave form is used to eliminate very other gate produced by the gate forming circuit 23.

The diagram of FIG. 10 illustrates the time relationship. By allowing every gate to be formed, a convenient method of checking linearity of the system is available. The azimuth gates formed are then applied to early and late gate coincidence circuits 26 and 27 respectively.

It is now necessary to shape the north reference group into a single pulse. This is done conventionally by using a 30 $\mu$sec. round trip delay line in the north reference detector 28. Alternatively a pulse may be developed by feeding the reference group directly into a high Q ringing circuit tuned to 33.3 kc. The pulse thus formed will be shaped by over-driving an amplifier using a sharp cut-off tube in the trigger forming circuit 29. Since the phantastron will be required to form 100% duty cycle delays, a trigger delay circuit 30 will be used, in the form of a single shot multivibrator. The delayed trigger is then applied to the phantastron 31.

The differentiated phantastron output is then fed to early and late gate forming circuits 32 and 33 (which may be in the form of single shot multivibrators) and their outputs may be fed to the corresponding early and late coincident circuits 26 and 27. Early coincidence of the phantastron gate and the 15-cycle gate will cause the motor 34 to turn the phantastron delay potentiometer 35 in such a direction as to cause coincidence with the late gate and the 15-cycle gate. The late gate and late coincidence circuit is arranged to drive the motor 34 in the opposite direction. The motor driving cathode followers 36 and 37 are arranged with long grid circuit time constants so that the absence of a few pulses will not cause the motor to search.

In the absence of coincidence between the 15-cycle gates and the phantastron gates, the motor is arranged so that tracking will occur from minimum delay to maximum delay. Limit switches 38 and 39 when closed will cause the reversing relay 40 to change position, reversing the motor polarity thus causing the phantastron to search in a new direction.

An azimuth indicator 41 is driven by the shaft of the potentiometer 35 so that a direct reading of the bearing of the receiver with respect to the beacon is on display at all times.

What is claimed is:

1. In a signaling system, an omnidirectional beacon for transmitting a train of pulses, means for modifying the field strength of said transmitted pulses in a given directional pattern about said beacon having a maximum strength transmission in a single direction, means for effectively rotating said pattern about said beacon at a given rate, means for transmitting a fixed direction signal from said beacon each time said pattern passes through a particular direction, a receiver responsive to said pulses transmitted by said beacon having means to derive a wave comprising the envelope of the amplitude of said pulses, said wave having a frequency equal to the rate of rotation of said pattern, means for deriving from said wave a series of trigger pulses, means for deriving from said fixed direction signal similar trigger pulses, bistable means triggered on by said trigger pulses derived from said wave and triggered off by said trigger pulses derived from said fixed direction signal for deriving a first rectangular wave, the duration of said first rectangular wave being a function of the phase relation of the two mentioned trigger pulses, monostable means triggered on by said trigger pulses derived from said wave and maintained in operation for an adjustable period of time by an adjustable potentiometer, means to derive from said monostable means a second rectangular wave, means for comparing said first rectangular wave with said second rectangular wave and a dial operated by said adjustable potentiometer means calibrated in bearing angles.

2. In a signaling system, an omnidirectional beacon for transmitting a train of pulses, means for modifying the field strength of said transmitted pulses in a given directional pattern about said beacon having a maximum strength transmission in a single direction, means for effectively rotating said pattern about said beacon at a given rate, means for transmitting a fixed direction signal from said beacon each time said pattern passes through a particular direction, a receiver responsive to said pulses transmitted by said beacon having means to derive a wave comprising the envelope of the amplitude of said pulses, said wave having a frequency equal to the rate of rotation of said pattern, means for deriving from said wave a series of trigger pulses, means for deriving from said fixed direction signal similar trigger pulses, bistable means triggered on by said trigger pulses derived from said wave and triggered off by said trigger pulses derived from said fixed direction signal for deriving a rectangular wave, monostable means triggered on by said trigger pulses derived from said wave and maintained in operation by an adjustable linear potentiometer means to derive a second rectangular wave directly proportional in length to the adjustment of said linear potentiometer, means for comparing the length of said first rectangular wave with the length of said second rectangular wave and an azimuth indicator directly responsive to the movement of said adjustable linear potentiometer for displaying bearing angles.

3. In a signaling system, an omnidirectional beacon for transmitting a train of pulses, means for modifying the field strength of said transmitted pulses in a given directional pattern about said beacon having a maximum strength transmission in a single direction, means for effectively rotating said pattern about said beacon at a given rate, means for transmitting a fixed direction signal from said beacon each time said pattern passes through a particular direction, a receiver responsive to said pulses transmitted by said beacon having means to derive a wave comprising the envelope of the amplitude of said pulses, said wave having a frequency equal to the rate of rotation of said pattern, means for deriving from said wave a series of trigger pulses, means for deriving from said fixed direction signal similar trigger pulses and means for measuring the effective distance in time between a trigger pulse derived from said wave and a trigger pulse derived from said fixed direction signal consisting of a phantastron rectangular wave generator means having a linear potentiometer for adjusting the duration of the rectangular output thereof to equality with said effective distance in time, and dial means for adjusting said linear potentiometer calibrated to exhibit readings in bearing angles.

4. In a signaling system, an omnidirectional beacon for transmitting a train of pulses, means for modifying the field strength of said transmitted pulses in a given directional pattern about said beacon having a maximum strength transmission in a single direction, means for effectively rotating said pattern about said beacon at a given rate, means for transmitting a fixed direction signal from said beacon each time said pattern passes through a particular direction, a receiver responsive to said pulses transmitted by said beacon having means to derive a wave comprising the envelope of the amplitude of said pulses, said wave having a frequency equal to the rate of rotation of said pattern, means for deriving from said wave a series of trigger pulses, means for deriving from said fixed direction signal similar trigger pulses, a bistable device with means for turning the device to its opposite stable state, respectively, by the pulses of the two mentioned series of trigger pulses, means for measuring fractions of a complete cycle of rotation of said field strength pattern, said means comprising an electronic device which being triggered into operation will create and maintain a distinctive output for a period directly proportional to an input potential, voltage comparing means for comparing the outputs of said bistable devices for said electronic devices, a linear potentiometer for selectively adjusting an input potential for said measuring device, means for moving said potentiometer until said measured fraction of rotation of said pattern equals a fraction of rotation defined by the angular distance from a trigger pulse derived from said fixed direction pulses and a trigger pulse derived from said wave, and a scale calibrated in bearing angles operated in step with said linear potentiometer.

5. In a signaling system, an omnidirectional beacon for transmitting a train of pulses, means for modifying the field strength of said transmitted pulses in a given directional pattern about said beacon having a maximum strength transmission in a single direction, means for effectively rotating said pattern about said beacon at a given rate, means for transmitting a fixed direction signal from said beacon each time said pattern passes through a particular direction, a receiver responsive to said pulses transmitted by said beacon having means to derive a wave comprising the envelope of the amplitude of said pulses, said wave having a frequency equal to the rate of rotation of said pattern, means for deriving from said wave a series of trigger pulses, means for deriving from said fixed direction signal similar trigger pulses, a flip-flop responsive to said trigger pulses for measuring the effective distance in bearing angles between a trigger pulse derived from said wave and a trigger pulse derived from said fixed direction signal, an electronic device which being triggered into operation will create and maintain an output for a period directly proportional to an input potential, means for triggering said device into operation by the first mentioned trigger pulses, a linear potentiometer for selectively adjusting an input potential for said device, means for moving said potentiometer until said device creates an output equal in duration to the output of said flip-flop and a meter for indicating the relative durations of the output voltages of said electronic device and of said flip-flop and an azimuth indicator having a scale calibrated in bearing angles operated in step with said linear potentiometer.

6. In a signaling system, an omnidirectional beacon for transmitting a train of pulses, means for modifying the field strength of said transmitted pulses in a given directional pattern about said beacon having a maximum strength transmission in a single direction, means for effectively rotating said pattern about said beacon at a given rate, means for transmitting a fixed direction signal from said beacon each time said pattern passes through a particular direction, a receiver responsive to said pulses transmitted by said beacon having means to derive a wave comprising the envelope of the amplitude of said pulses, said wave having a frequency equal to the rate of rotation of said pattern, means for deriving from said wave a series of trigger pulses, means for deriving from said fixed direction signal similar trigger pulses and means for measuring the effective distance in time between a trigger pulse derived from said wave and a trigger pulse derived from said fixed direction signal, said measuring circuit including a monostable electronic circuit which being triggered into operation will create and maintain an output for a period directly proportional to an input potential to said circuit, a linear potentiometer for adjusting an input potential for said device until said output is exactly equal to said effective distance in time, and means responsive to overlap between said output of said monostable circuit and the output of said means for deriving the first mentioned trigger pulses for operating said linear potentiometer, and an azimuth indicator movable with and in direct proportion to the movement of said linear potentiometer.

7. A receiver for use with an omnidirectional beacon system which produces, by rotation of a radiation pattern, a periodic variation in amplitude at a frequency directly related to the speed of said rotation providing a bearing signal, and modulated with a reference frequency signal, having means for separating said bearing signal and said reference signal, said receiver comprising: means to derive signal spikes from said bearing signal and said reference signal, means to produce a rectangular wave form measured in duration from a bearing signal spike to a reference signal spike, and means for measuring the ratio of the duration of a said rectangular wave to the length of a cycle between said derived signal spikes, the last named means comprising a monostable phantastron-type circuit with an adjustable potentiometer for regulating the duration of the unstable state, and means for comparing the rectangular waveform of said monostable circuit to the first mentioned rectangular waveform.

8. A receiver for use with an omnidirectional beacon system which produces, by rotation of a radiation pattern, a periodic variation in amplitude at a frequency directly related to the speed of said rotation providing a bearing signal, and modulated with a reference frequency signal, having means for separating said bearing signal and said reference signal, said receiver comprising: means to derive signal spikes from said bearing signal and said reference signal, means to produce a rectangular wave form limited in duration by a bearing signal spike and a reference signal spike, and means for translating said rectangular wave into a measure of the bearing of said receiver with respect to said beacon including a monostable multivibrator with a potentiometer control for the duration of the unstable state, means for comparing the duration of the output of the multivibrator with the duration of said rectangular waveform, the potentiometer control for said multivibrator being calibrated in units of azimuth.

9. A receiver for use with an omnidirectional beacon system which produces, by rotation of a radiation pattern, a periodic variation in amplitude at a frequency directly related to the speed of said rotation providing a bearing signal and modulated with a reference frequency signal, having means for separating said bearing signal and said reference signal, said receiver comprising: means to derive signal spikes from said bearing signal and said reference signal, means to produce a rectangular wave form limited in duration by a bearing signal spike and a reference signal spike, and bearing indicator means responsive to said derived rectangular wave form including a monostable multivibrator with a potentiometer control for the duration of the unstable state, means for comparing the duration of the output of the multivibrator with the duration of said rectangular waveform, the potentiometer control for said multivibrator being calibrated in units of azimuth.

References Cited in the file of this patent

UNITED STATES PATENTS

| | | |
|---|---|---|
| 2,792,570 | Stewart | May 14, 1957 |
| 2,803,821 | Pickles et al. | Apr. 20, 1957 |
| 2,883,662 | Rodgers | Apr. 21, 1959 |